United States Patent
Theodorou et al.

(10) Patent No.: US 11,283,630 B2
(45) Date of Patent: Mar. 22, 2022

(54) SERVER/SERVER CERTIFICATES EXCHANGE FLOW

(71) Applicant: International Business Machines Corporation, Armonk, NY (US)

(72) Inventors: Erez Alexander Theodorou, Petah Tikva (IL); Amalia Avraham, Petah Tikva (IL); Eran Tzabari, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 16/674,954

(22) Filed: Nov. 5, 2019

(65) Prior Publication Data
US 2021/0135884 A1    May 6, 2021

(51) Int. Cl.
*H04L 9/32* (2006.01)
*H04L 29/06* (2006.01)

(52) U.S. Cl.
CPC ........... *H04L 9/3268* (2013.01); *H04L 63/08* (2013.01); *H04L 63/168* (2013.01)

(58) Field of Classification Search
CPC ...... H04L 63/08; H04L 63/168; H04L 9/3268
USPC ....................................................... 713/156
See application file for complete search history.

(56) References Cited

U.S. PATENT DOCUMENTS

| | | | |
|---|---|---|---|
| 7,600,123 B2 | 10/2009 | Parupudi et al. | |
| 7,831,693 B2 | 11/2010 | Lai | |
| 7,904,951 B1 | 3/2011 | Ebrahimi et al. | |
| 7,937,583 B2 | 5/2011 | Thornton et al. | |
| 2005/0076200 A1 | 4/2005 | Thornton et al. | |
| 2009/0083537 A1 | 3/2009 | Larsen et al. | |
| 2009/0319783 A1* | 12/2009 | Thornton | H04L 9/3226 713/156 |
| 2011/0231655 A1 | 9/2011 | Bollay et al. | |
| 2020/0382324 A1* | 12/2020 | Pierscieniak | H04L 9/3268 |

* cited by examiner

*Primary Examiner* — Benjamin A Kaplan
(74) *Attorney, Agent, or Firm* — Patterson + Sheridan, LLP

(57) ABSTRACT

Embodiments herein describe providing a certificate signed by a local CA to an unauthenticated server rather than obtaining a certificated signed by a third-party CA. A server that already has a certificate that was signed by a third-party CA may want to establish secure connection with an unauthenticated server which does not have a signed certificate. The unauthenticated server needs a certificate signed by a CA trusted by the server that already has a signed certificate (referred to herein as the authenticated server). To do so, the unauthenticated server sends login credentials to the authenticated server so that this server knows it can trust the unauthenticated server. In turn, the authenticated server can send its signed certificate to the unauthenticated server so it can verify the authenticated server. Once verified, the authenticated server generates a signed certificate for the unauthenticated server using a local CA.

17 Claims, 5 Drawing Sheets

SERVER/SERVER CERTIFICATES EXCHANGE FLOW

BACKGROUND

The present invention relates to authenticating a server, and more specifically, to providing an unauthenticated server with a certificate signed by a local certificate authority (CA).

Secure sockets layer (SSL) certificates create a foundation of trust by establishing a secure connection. When two entities want to establish a connection, many security standards require SSL connectivity, and thus, an exchange of SSL certificates. This is true for server-agent relationship (e.g., a web-browser establishing a secure connection with a web server) as well as server-server relationship (e.g., a first server managing servers in a data center).

SSL certificates have a key pair: a public key and a private key. These keys work together to establish an encrypted connection. With a server-server relationship, both servers need a certificate signed by a CA trusted by both servers. As such, each time a new server is deployed, the system administrator needs to obtain a signed certificate from a trusted CA before a secure SSL connection to another server (or an agent) can be established. However, obtaining a signed CA from a globally trusted CA is a time consuming and manual process.

SUMMARY

According to one embodiment of the present disclosure is a method that includes receiving a login credential from an unauthenticated server, and after verifying the login credential, transmitting a signed certificate to the unauthenticated server from an authenticated server. The method also includes generating a new certificate for the unauthenticated server using a local CA, where the local CA is operated by a same entity that operates the authenticated server, and transmitting the new certificate to the unauthenticated server.

Another embodiment of the present disclosure is a computing system that includes a local CA and an authenticated server configured to receive a login credential from an unauthenticated server, and after verifying the login credential, transmit a signed certificate to the unauthenticated server. The authenticated server is configured to receive a new certificate for the unauthenticated server generated by the local CA, wherein the local CA is operated by a same entity that operates the authenticated server and transmit the new certificate to the unauthenticated server.

Another embodiment of the present disclosure is an unauthenticated server that includes a processor and memory where the memory stores one or more programs that, when executed by the processor, perform an operation. The operation includes transmitting a login credential to an authenticated server, receiving a signed certificate from the authenticated server, upon verifying that the signed certificate was signed by a trusted CA, requesting a new certificate from the authenticated server, and receiving the new certificate where the new certificate is signed by a CA that is operated by a same entity that operates the authenticated server.

DETAILED DESCRIPTION

Embodiments herein describe providing a certificate signed by a local CA to an unauthenticated server rather than obtaining a certificate signed by a globally recognized (or third-party) CA. As mentioned above, signed certificates can be used to establish secure connections (e.g., SSL connections) between two entities connected by a network. Rather than spending the time, effort, and cost to obtain a certificate signed by a third-party CA (e.g., a company that provides signed certificates such as Verisign), the embodiments herein use a local CA which is hosted by, or connected to, one of the servers attempting to form the secure connection.

For example, a server that already has a certificate that was signed by a third-party CA may want to establish a secure connection with an unauthenticated server which does not have a signed certificate. For instance, the unauthenticated server may be a newly deployed server. Before establishing the secure connection, the unauthenticated server needs a certificate signed by a CA trusted by the server that already has a signed certificate (referred to herein as the authenticated server). To do so, the unauthenticated server sends login credentials to the authenticated server so that this server knows it can trust the unauthenticated server. In turn, the authenticated server can send its signed certificate to the unauthenticated server so it can verify the authenticated server.

Once verified, the authenticated server generates a signed certificate for the unauthenticated server using a local CA. This CA may be trusted by a limited number of servers (e.g., servers owned or operated by a particular company). Thus, in one embodiment, the signed certificate provided to the unauthenticated server can be used to establish a secure connection with only the servers owned by that company. The unauthenticated server can then install the signed certificate and terminate the connection with the authenticated server. The authenticated and unauthenticated servers can then exchange signed certificates to establish a secure connection.

Figure 1:
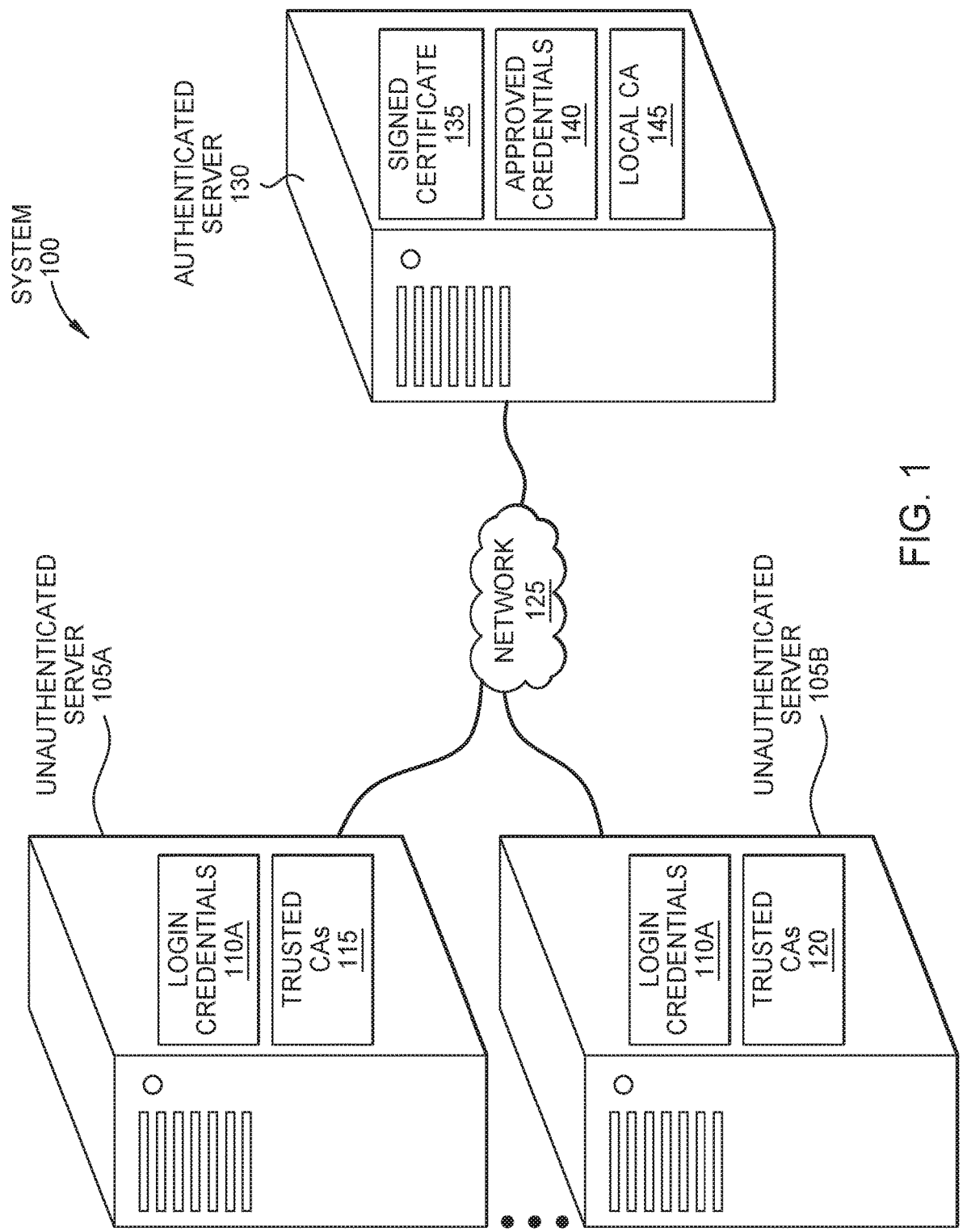
FIGS. 1 and 2 are block diagrams of systems for authenticating servers using a local CA, according to one embodiment described herein.

FIG. 1 is a block diagram of a system 100 for authenticating servers using a local CA 145, according to one embodiment described herein. The system 100 includes multiple unauthenticated servers 105 (e.g., computing systems that include at least one processor and memory) which do not yet have their own signed certificate. For example, the unauthenticated servers 105 have recently been deployed in the system 100. The system 100 also includes an authenticated server 130 (e.g., a computing system that includes at least one processor and memory) which has its own signed certificate 135. In the embodiments below, it is assumed that the authenticated server 130 is used to establish a secure connection (e.g., a SSL connection) with the unauthenticated servers 105. Because the unauthenticated servers 105 lack signed certificates, the authenticated server 130 includes a local CA 145 that can generate a certificate for the unauthenticated servers 105. Because the local CA 145 is hosted by the authenticated server 130, the signed certificate it generates are from a trusted source, and thus, can be used to establish a secure connection between the servers 105 and 130.

In one embodiment, before providing a signed certificate to the unauthenticated servers 105 using the local CA 145, the servers 105 and 130 first establish mutual trust. To do so, the authenticated server 130 transmits its signed certificate 135 to the unauthenticated server 105 which determines whether the certificate 135 was signed by a trusted CA 115. An encrypted channel is now established between server 130 and server 115 (for example an SSL). On the other side, the unauthenticated servers 105 include login credentials 110 which are sent to the authenticated server 130, though the encrypted channel and are compared to a list of approved credentials 140. If the login credentials 110 match the list of approved credentials, the authenticated server 130 knows it can trust the unauthenticated server 105. If trust is established at both the unauthenticated server 105 and the authenticated servers 130, then signed certificates are generated by the local CA 145, provided to the unauthenticated servers 105, and then installed at the unauthenticated servers 105. Once this is performed, the unauthenticated servers 105 are now authenticated. This process of providing signed certificates to the unauthenticated servers 105 is described in more detail in the flowcharts below.

The system 100 includes a network 125 that communicatively couples the unauthenticated servers 105 to the authenticated server 130. This network 125 can be a local network or an untrusted public network (e.g., the internet). In one embodiment, the authenticated server 130 is located at a different geographical location from the unauthenticated servers 105. Further, the unauthenticated servers 105 may be located at different geographic locations from each other. For example, the server 105A may be located in a first data center while the server 105B is located in a second data center. Using the techniques described herein, the authenticated server 130 can provide signed certificates to the unauthenticated servers 105 so that secure connections can be established regardless of the respective geographic locations of the servers.

In one embodiment, the authenticated server 130 is owned or operated by a separate entity (e.g., a different company or service) than the unauthenticated servers 105. Further, because the local CA 145 is hosted by the authenticated server 130, the local CA 145 is operated or owned by the same entity as the authenticated server 130.

While FIG. 1 and the embodiments that follow refer to "servers", they are not limited to such. The embodiments herein can be used to provide signed certificates to any computing systems or devices.

Figure 2:
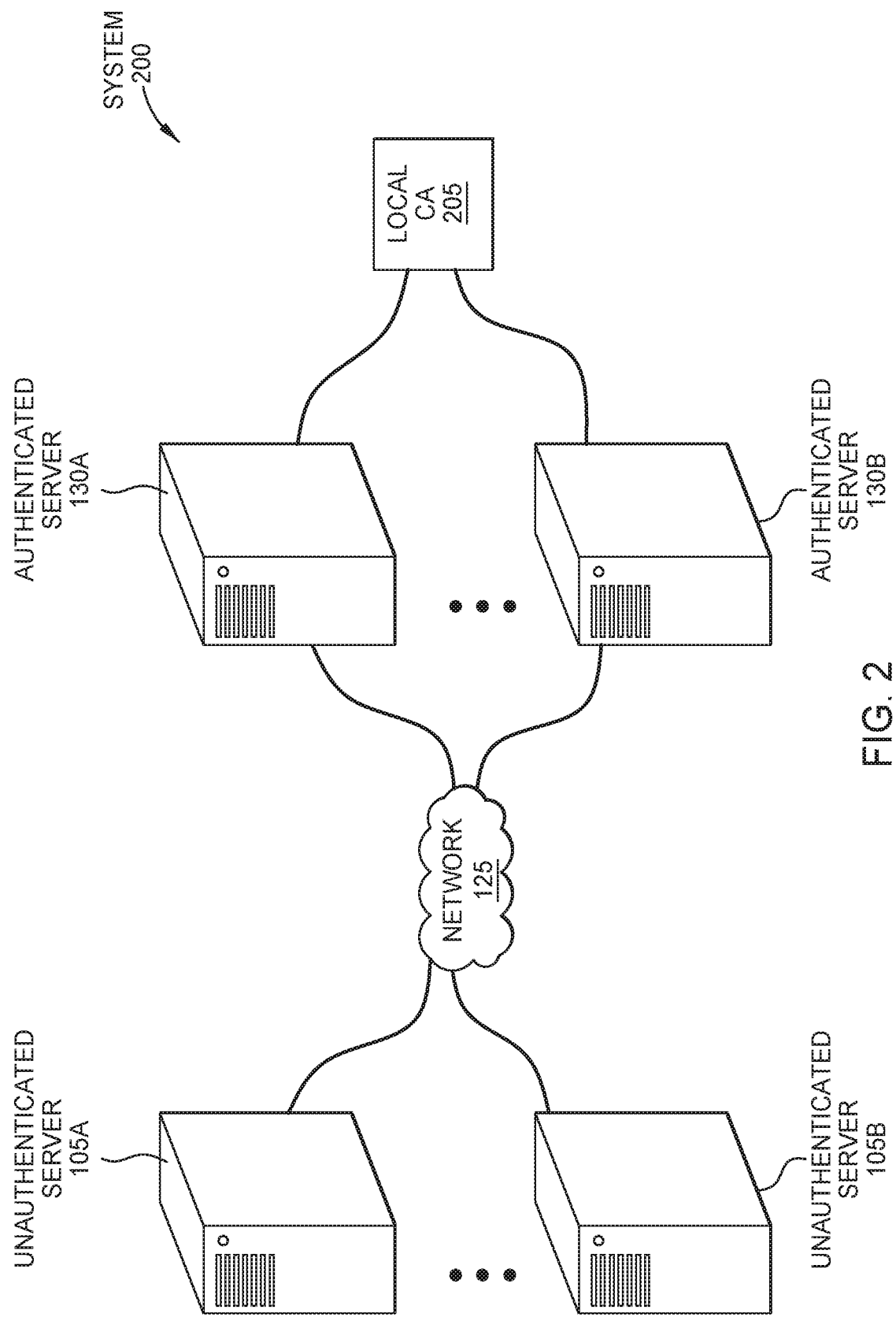

FIG. 2 is a block diagram of a system 200 for authenticating servers using a local CA 205, according to one embodiment described herein. The system 200 includes multiple unauthenticated servers 105 (which may each include login credentials and trusted CAs as illustrated in FIG. 1) and multiple authenticated servers 130. However, rather than each authenticated server hosting its own local CA, the authenticated servers 130 use a shared, local CA 205 to generate signed certificates for the unauthenticated servers 105. That is, the authenticated servers 130 in the system 200 may each include a signed certificate 135 and a list of approved credentials 140. However, instead of hosting a local CA, the system 200 includes a local CA 205 that is separate from the authenticated servers 130. For example, the local CA 205 may be hosted on a separate computing system, or may be hosted by one of the authenticated servers 130. In this manner, the local CA 205 can be shared by multiple authenticated servers 130.

In one embodiment, the authenticated servers 130 and the local CA 205 may be part of a service, or operated by an entity, that manages the unauthenticated servers 105. For example, the authenticated servers 130 may be tasked with establishing and maintaining a network formed by the unauthenticated servers 105 which may be owned by a different entity, or are part of a different service. The authenticated servers 130, for example, can establish and manage a data center using the unauthenticated servers 105. However, before doing so, a secure connection is established between the servers 103 and 105 using the techniques described herein.

In one embodiment, the local CA 205 may be operated by a different entity than the authenticated servers 130. The local CA 205 may nonetheless be affiliated with the entity that operates the authenticated servers. For example, there may be a contractual relationship between the entities that permits the authenticated servers to request signed certificates from the local CA 205 using a network without requiring user intervention (e.g., programmatically). In another example, the authenticated servers 130 and the local CA 205 may be operated by different divisions of the same company. In any case, the local CA 205 is a trusted CA to the perspective of the authenticated server.

Figure 3:
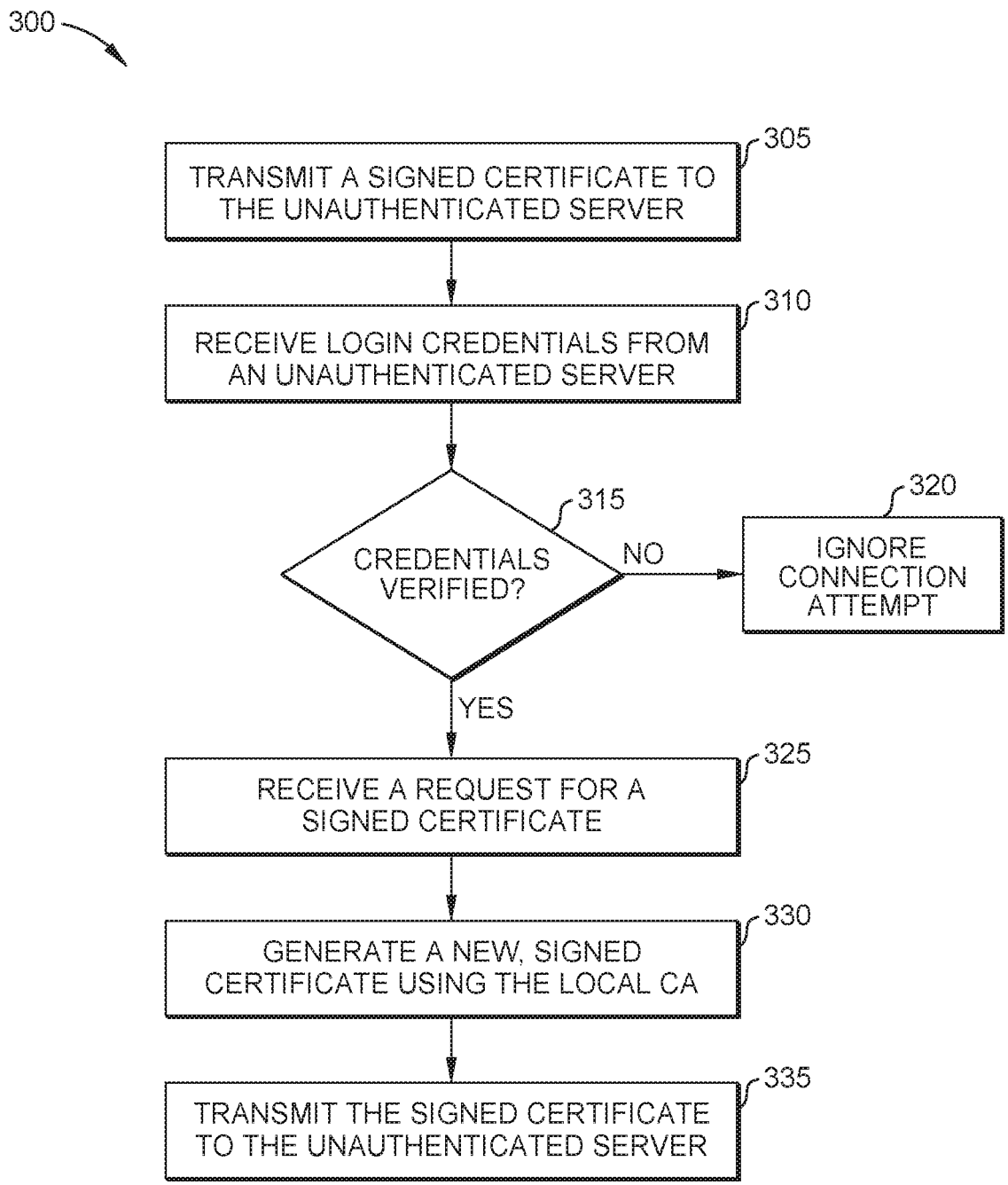
FIG. 3 is a flowchart for providing a certificate signed by a local CA to an unauthenticated server, according to one embodiment described herein.

FIG. 3 is a flowchart of a method 300 for providing a certificate signed by a local CA to an unauthenticated server, according to one embodiment described herein. The method 300 describes an authentication process from the perspective of a server that already has a certificate signed by a trusted CA (e.g., the authenticated servers 130 illustrated in FIGS. 1 and 2).

At block 305, the authenticated server transmits a signed certificate to the unauthenticated server. As mentioned above, the certificate may be signed by a CA that is trusted by both the authenticated and the unauthenticated servers. In one embodiment, the CA is a third-party CA. For example, the CA that signed the certificate may be external to, or separate from, the company or entity that manages the authenticated server(s) and the company or entity that manages the unauthenticated server(s). As described later, the unauthenticated server can verify the signed certificate so that the server knows it can trust the authenticated server.

At block 310, the authenticated server receives login credentials from an unauthenticated server. In one embodiment, the login credentials are provided to, or stored within, the unauthenticated server sometime previous to the start of the method 300. For example, when a company or entity signs up for service provided by the authenticated server, the company is provided with login credentials that its unauthenticated servers can use to establish trust with the authenticated server and receive a signed certificate.

The login credentials can be any data that enables the authenticated server to establish trust with the unauthenticated server. As mentioned above, the unauthenticated server does not have a signed certificate from a CA that is trusted by the authenticated server (e.g., a third-party CA). Rather than going through the process of obtaining the signed certificate, the login credentials can be used instead to verify that the unauthenticated server is who it says it is and can be trusted. In one embodiment, the login credentials include a password and ID, but are not limited to such. In another example, the login credentials could be a single sign-on that is provided by the entity operating the authenticated server. In another example, the login credentials may be a code that expires after a predetermined time. In general, the login credentials can be any information that permits the authenticated server to authenticate (and trust) the unauthenticated server.

At block 315, the authenticated server attempts to verify the received login credentials are verified. For example, the authenticated server can maintain a list of recognized credentials that are compared to the received login credentials to verify the credentials. When providing the login credentials to the unauthenticated server, a system administrator may also ensure those same credentials are stored in the authenticated server.

In another example, rather than using a list of credentials, the authenticated server may use a security algorithm to determine whether the login credentials are valid. For example, the login credentials may be a temporary code derived from particular algorithm. The authenticated server can use its own algorithm to verify the temporary code, thereby authenticating the unauthenticated server.

If the login credentials are not recognized (or verified), the method 300 proceeds to block 320 where the authenticated server does not proceed with the remaining blocks in the flow. That is, because the unauthenticated server failed to establish a relationship of trust with the authenticated server, the authenticated server ceases further communication with the unauthenticated server.

Otherwise, if the login credentials are recognized, the authenticated server now trusts the unauthenticated server. However, for two-way secure communication to work, the unauthenticated server also should establish trust in the authenticated server. That is, the unauthenticated server should be able to verify that the authenticated server is who it says it is. This was accomplished at block 305 where the authenticated server transmits the signed certificate to the unauthenticated server.

At block 325, the authenticated server receives a request for a signed certificate from the unauthenticated server. In one embodiment, the unauthenticated server sends this request only after verifying the signed certificate it was provided at block 305. That is, the unauthenticated server requests a signed certificate from the authenticated server after establishing that it can trust the authenticated server.

At block 330, the authenticated server generates a new signed certificate using the local CA. As mentioned above, the local CA can be executed on the authenticated server, or can be a shared local CA that is used by a plurality of authenticated servers to provide signed certificates to unauthenticated servers. In either case, in one embodiment, the local CA is not a third-party CA but rather a CA that is operated and controlled by the same entity that operates the authenticated servers. Thus, a new certificate signed by the local CA may be recognized as being signed by a trusted CA for a limited number of servers (e.g., only the servers operated by (or affiliated with) the same entity that operates the local CA). Put differently, the unauthenticated server may be able to use the new certificate signed by the local CA to establish a secure SSL connection with the authenticated server or other computing systems operated by the same entity that operates the local CA, but not to computing systems operated by different entities. However, this limitation may be acceptable since it may be intended that the unauthenticated server should be managed only by computing systems operated by the same entity that operates the local CA. Thus, using certificates signed by a local CA can provide additional security by limited the ability of other entities to establish secure connections with the unauthenticated servers. Further, using signed certificates from the local CA avoids the time and resources needed to obtain a certificate signed by a third-party CA, which may reduce the time needed to deploy the unauthenticated server.

At block 335, the authenticated server transmits the signed certificate to the unauthenticated server. At this point, the connection between the unauthenticated and authenticated server can be terminated. For example, once the unauthenticated server receives the signed certificate, it can terminate the connection.

Figure 4:
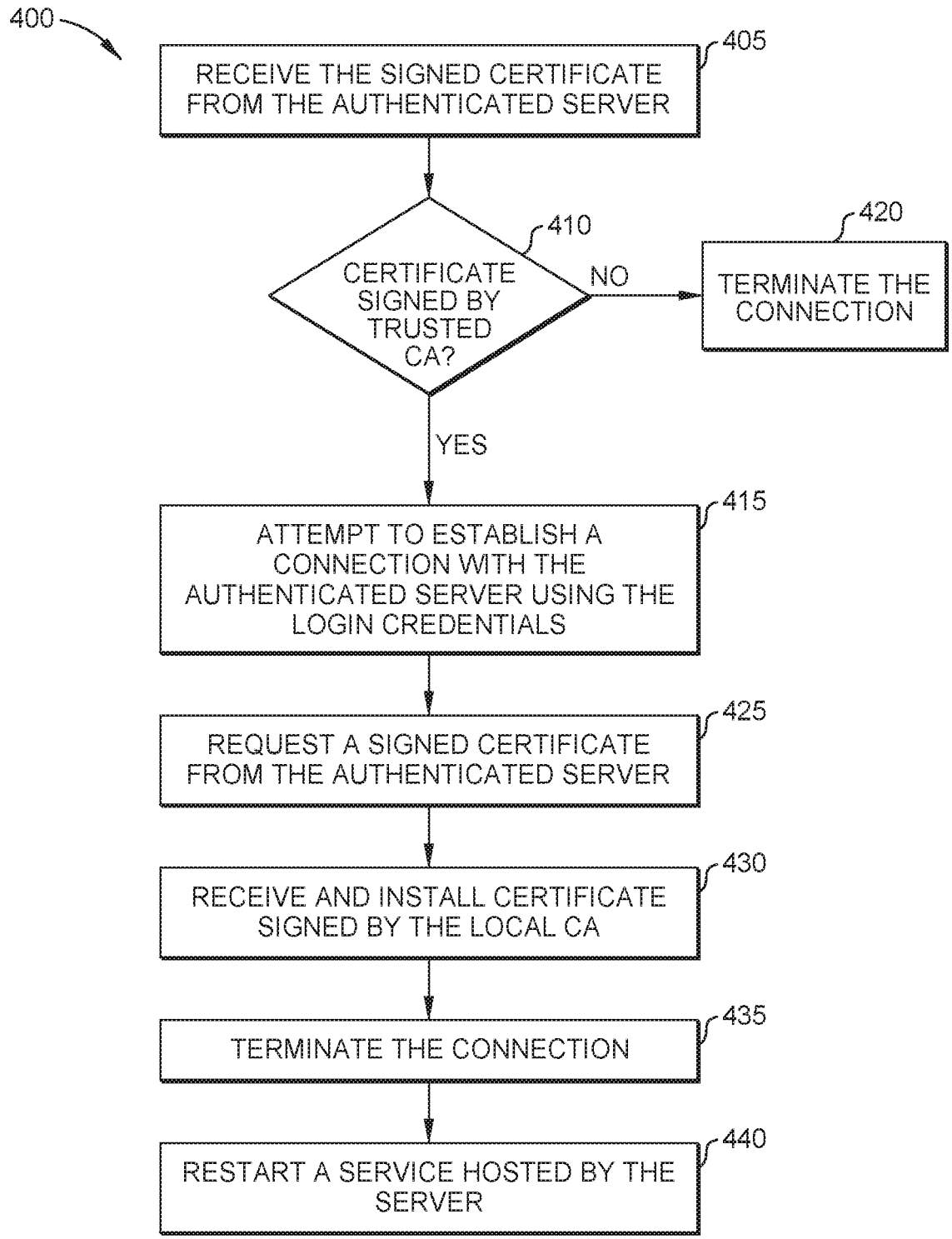
FIG. 4 is a flowchart for receiving a certificate signed by a local CA associated with an authenticated server, according to one embodiment described herein.

FIG. 4 is a flowchart of a method 400 for receiving a certificate signed by a local CA associated with an authenticated server, according to one embodiment described herein. The method 400 describes the authentication process from the perspective of a server that does not yet have a signed certificate for establishing a secure connection (e.g., the unauthenticated servers 105 illustrated in FIGS. 1 and 2).

At block 405, the unauthenticated server receives the signed certificate from the authenticated server. As illustrated in the method 300 in FIG. 3, the authenticated server provides the signed certificate to the unauthenticated server.

At block 410, the unauthenticated server determines whether the received certificate was signed by a trusted CA. The embodiments herein can be used with any technique for verifying a signed certificate. As one such example, the unauthenticated server checks the certificate roots against a list of trusted CAs to ensure the certificate was signed by at least one of those CAs. The unauthenticated server may also verify that the certificate is unexpired, unrevoked, and that its common name (e.g., a domain name) is valid (assuming the authenticated server is affiliated with a common name).

If the unauthenticated server cannot determine that the certificate was received from a trusted CA, the method 400 proceeds to block 420 where the unauthenticated server terminates the connection. That is, if the unauthenticated server cannot verify the identity of the authenticated server, it stops communicating with the server.

However, if the unauthenticated server determines the certificate was signed by a trusted CA, this means the unauthenticated server can trust the authenticated server. As such, the method 400 proceeds to block 415 where the unauthenticated server 105 attempts to log in with the authenticated server using login credentials. In one embodiment, the login credentials are provided to, or loaded into, the unauthenticated server sometime previous to the start of the method 400. For example, as mentioned above, when a company or entity that operates the unauthenticated server signs up for service provided by the authenticated server, the company is provided with login credentials that its unauthenticated servers can use to establish trust with the authenticated server and receive a signed certificate.

The login credentials can be any data that enables the authenticated server to establish trust with the unauthenticated server. Because it is assumed the unauthenticated server does not have a signed certificate from a CA that is trusted by the authenticated server (e.g., a third-party CA), the unauthenticated server can use the login credentials to prove to the authenticated server it should be trusted. In one embodiment, the login credentials include a password and ID, a single sign-on, or a temporary code. The login credentials could also be some information about the authenticated server that is "unspoofable." In general, the login credentials can be any information that permits the authenticated server to authenticate (and trust) the unauthenticated server.

At block 425, the unauthenticated server requests a signed certificate from the authenticated server. As mentioned above, this certificate is signed by a local CA rather than a global (or third-party) CA.

At block 430, the unauthenticated server receives and installs a certificate signed by the local CA. In one embodiment, the unauthenticated server installs the signed certificate in its webserver so that its webserver can use the certificate to establish secure connections.

At block 435, the unauthenticated server terminates the connection with the authenticated server.

At block 440, the unauthenticated server restarts a service that is hosted by the unauthenticated server. For example, the service may be a webserver that establishes secure connections that can be leveraged by the authenticated server to manage the unauthenticated server.

Figure 5:
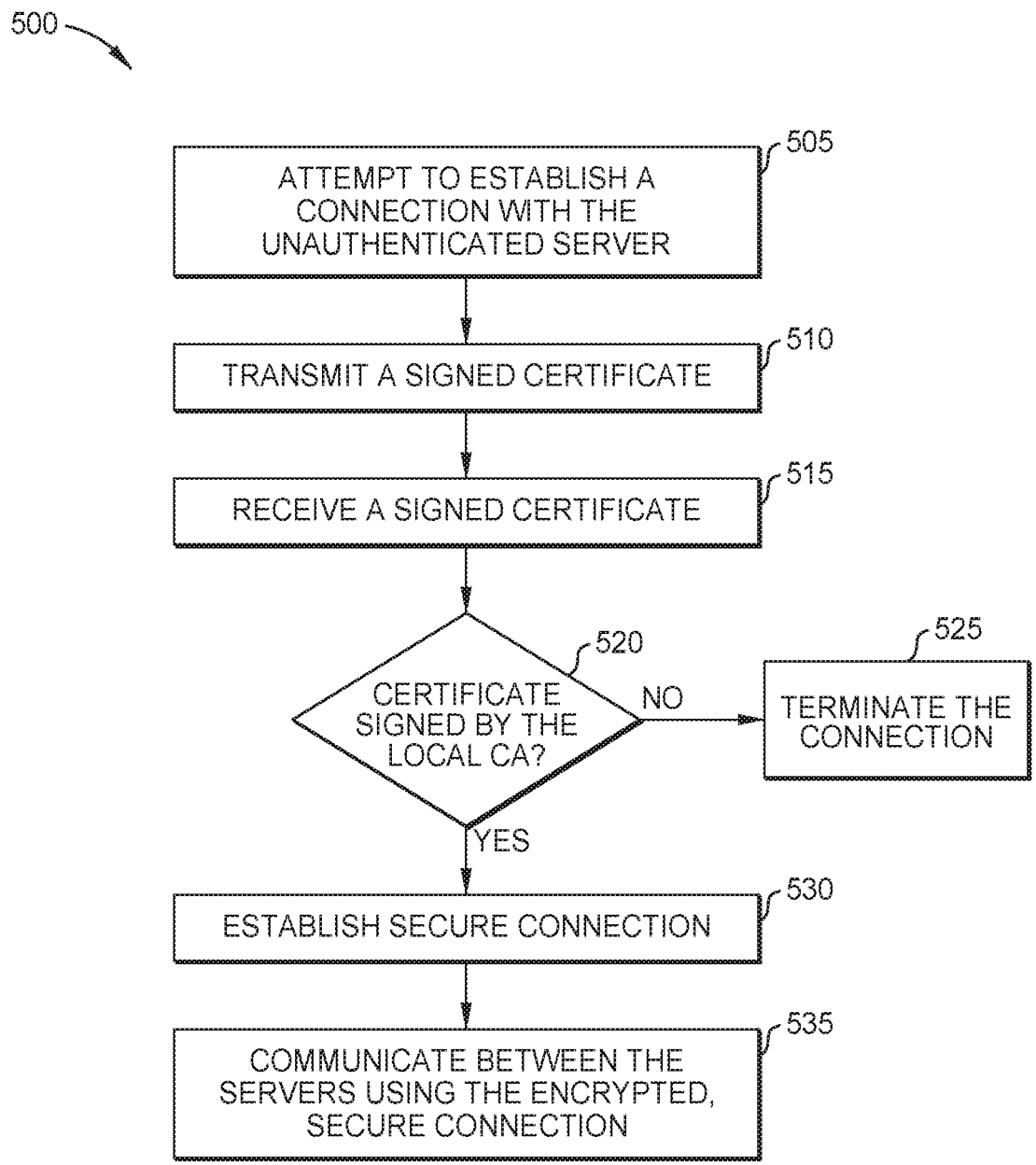
FIG. 5 is a flowchart for establishing a secure connection with a server using a certificate signed by a local CA, according to one embodiment described herein.

FIG. 5 is a flowchart of a method 500 for establishing a secure connection with a server using a certificate signed by a local CA, according to one embodiment described herein. In one embodiment, the method 500 begins after the methods 300 and 400 have been completed where the authenticated server has provided a certificate signed by a local CA to the unauthenticated server. Because a signed certificate has been provided to the unauthenticated server, it has now been authenticated, and thus, can be referred to as an "authenticated server". However, for clarity, the server is still referred to below as an unauthenticated server although it has been authenticated.

At block 505, the authenticated server attempts to establish a connection with the unauthenticated server. Or vice versa, the unauthenticated server attempts to establish a connection with the authenticated server. In either case, this connection may be a new connection rather than a continuation of the connection used in the methods 300 and 400 described above. Unlike in methods 300 and 400 where initially only the authenticated server has a signed certificate, during the method 500 both the authenticated server and the unauthenticated server has signed certificates, albeit these certificates may be signed by different CAs.

At block 510, the authenticated server transmits its signed certificate to the unauthenticated server. Although not shown in the method 500, the unauthenticated server can perform a similar process as described in the method 400 to verify the authenticated server using its signed certificate—i.e., to determine whether the certificate was signed by a trusted CA.

At block 510, the authenticated server receives a signed certificate from the unauthenticated server. At block 515, the authenticated server determines whether the received certificate was signed by the local CA. If not, the method proceeds to block 520 where the authenticated server terminates the attempt to connect to the unauthenticated server. However, if the authenticated server determines the certificate was signed by the local CA, the method instead proceeds to block 525 where the authenticated and unauthenticated servers establish a secure connection (e.g., a SSL connection based on the exchange of signed certificates).

In one embodiment, the servers perform a SSL handshake to form the secure connection using an agent-server relationship. In this example, the authenticated server is the agent while the unauthenticated server running the application is the server. When attempting to connect to the unauthenticated server, the authenticated server requests that the unauthenticated server identify itself. In response, the unauthenticated server transmits its signed certificate to the authenticated server. The received certificate can include a public key (which was issued by the local CA). In one embodiment, each certificate corresponds to a public key and a private key which work together to establish an encrypted connection. Anything encrypted with the public key can only be decrypted with the private key, and vice versa.

The authenticated server can check the certificate root to ensure the certificate was signed by the local CA and is unexpired and unrevoked. If trust is established, the authenticated server creates, encrypts, and sends back to the unauthenticated server a symmetric session key using the unauthenticated server's public key included in its certificate. Because encrypting and decrypting with private and public key uses a significant amount of processing power, in one embodiment, the public and private keys are used only during the SSL handshake to create the symmetric session key. The unauthenticated server decrypts the symmetric session key using its private key and sends back an acknowledgement encrypted with the session key to start the encrypted session. The servers can now encrypt transmitted data with the session key.

However, performing a SSL handshake is only one example of establishing a secure or encrypted connection using an exchange of signed certificates. The embodiments herein can be used with any type of certificate exchange to generate an encrypted connection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., data center applications) or related data available in the cloud. For example, the data center applications could execute on a computing system in the cloud on servers that were authenticated using the techniques described above. In such a case, the data center applications could execute on the newly authenticated servers and store data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
transmitting a signed certificate of an authenticated server from the authenticated server to an unauthenticated server, wherein the signed certificate is generated by a first certificate authority (CA) that is operated by an entity that is different from an entity that operates the authenticated server;
after the unauthenticated server verifies the signed certificate of the authenticated server, receiving, at the authenticated server, a login credential from the unauthenticated server;
in response to the authenticated server verifying the login credential, generating a new certificate for the unauthenticated server using a local CA that is operated by the entity that operates the authenticated server; and
transmitting the new certificate to the unauthenticated server.

2. The method of claim 1, wherein at least one of: (i) the local CA executes on the authenticated server or (ii) the local CA executes on a separate computing system and is shared by a plurality of authenticated servers operated by the same entity.

3. The method of claim 1, wherein the signed certificate was signed by a third-party CA before receiving the login credential from the unauthenticated server.

4. The method of claim 1, further comprising receiving a request from the unauthenticated server to generate the new certificate, wherein the request indicates that the unauthenticated server has determined that the signed certificate was signed by a trusted CA.

5. The method of claim 1, further comprising after transmitting the new certificate to the unauthenticated server, establishing a secure connection to the unauthenticated server by exchanging the signed certificate and the new certificate.

6. The method of claim 5, wherein establishing the secure connection comprises performing a secure sockets layer (SSL) handshake, wherein the secure connection is a SSL connection.

7. A computing system, comprising:
a local certificate authority (CA); and
an authenticated server, wherein the authenticated server is configured to:
receive a signed certificate from an unauthenticated server, wherein the signed certificate is generated by a first certificate authority (CA) that is operated by an entity that is different from an entity that operates the authenticated server;
after verifying the signed certificate, receive a login credential from the unauthenticated server;
receive a new certificate for the unauthenticated server, wherein the new certificate is generated by the local CA in response to the authenticated server verifying the login credential, wherein the local CA is operated by the entity that operates the authenticated server; and
transmit the new certificate to the unauthenticated server.

8. The computing system of claim 7, wherein at least one of: (i) the local CA executes on the authenticated server or (ii) the local CA executes on an a separate server in the computing system and is shared by a plurality of authenticated servers operated by the same entity.

9. The computing system of claim 7, wherein the signed certificate was signed by a third-party CA that verifies an identify of the authenticated server.

10. The computing system of claim 7, wherein the authenticated server is further configured to receive a request from the unauthenticated server to generate the new certificate, wherein the request indicates that the unauthenticated server has determined that the signed certificate was signed by a trusted CA.

11. An unauthenticated server, comprising:
a processor; and
memory, wherein the memory stores one or more programs that, when executed by the processor, perform an operation, the operation comprises:
verifying a signed certificate from an authenticated server, wherein the signed certificate is generated by a first certificate authority (CA) that is operated by an entity that is different from an entity that operates the authenticated server;
after verifying the signed certificate, transmitting a login credential to an authenticated server;
after the authenticated server verifies the login credential, requesting a new certificate from the authenticated server; and
receiving the new certificate, wherein the new certificate is signed by a local CA that is operated by the entity that operates the authenticated server.

12. The unauthenticated server of claim 11, wherein the signed certificate was signed by a third-party CA before the authenticated server transmitted the login credential to the authenticated server.

13. The unauthenticated server of claim 11, wherein the operation further comprises terminating a connection with the authenticated server after receiving the new certificate.

14. The unauthenticated server of claim 11, wherein the operation further comprises:
installing the new certificate; and
restarting a service hosted by the unauthenticated server.

15. The unauthenticated server of claim 11, wherein verifying the signed certificate comprises comparing a CA corresponding to the signed certificate to a list of trusted CAs stored in the unauthenticated server.

16. The unauthenticated server of claim 11, the operation further comprises after receiving the new certificate, establishing a secure connection to the authenticated server by exchanging the signed certificate and the new certificate.

17. The unauthenticated server of claim 16, wherein establishing the secure connection further comprises performing a SSL handshake, wherein the secure connection is a SSL connection.

\* \* \* \* \*